(12) United States Patent
Honda et al.

(10) Patent No.: US 7,756,320 B2
(45) Date of Patent: Jul. 13, 2010

(54) DEFECT CLASSIFICATION USING A LOGICAL EQUATION FOR HIGH STAGE CLASSIFICATION

(75) Inventors: Toshifumi Honda, Yokohama (JP); Atsushi Miyamoto, Yokohama (JP); Hirohito Okuda, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 844 days.

(21) Appl. No.: 10/794,267

(22) Filed: Mar. 4, 2004

(65) Prior Publication Data

US 2004/0234120 A1 Nov. 25, 2004

(30) Foreign Application Priority Data

Mar. 12, 2003 (JP) ............................... 2003-066581

(51) Int. Cl.
*G06K 9/00* (2006.01)
(52) U.S. Cl. ...................................... 382/149; 382/227
(58) Field of Classification Search .................. 702/34, 702/35, 37; 382/145, 149, 224, 155; 324/537; 348/92; 356/237.1; 700/47
See application file for complete search history.

(56) References Cited

U.S. PATENT DOCUMENTS

| | | | | | |
|---|---|---|---|---|---|
| 5,463,773 | A | * | 10/1995 | Sakakibara et al. | 707/102 |
| 5,917,332 | A | * | 6/1999 | Chen et al. | 324/765 |
| 5,982,933 | A | * | 11/1999 | Yoshii et al. | 382/226 |
| 6,148,099 | A | * | 11/2000 | Lee et al. | 382/149 |
| 6,480,621 | B1 | * | 11/2002 | Lyon | 382/157 |
| 6,564,198 | B1 | * | 5/2003 | Narayan et al. | 706/60 |
| 6,922,482 | B1 | * | 7/2005 | Ben-Porath | 382/149 |
| 2001/0042705 | A1 | * | 11/2001 | Nakagaki et al. | 209/44.4 |
| 2003/0164942 | A1 | * | 9/2003 | Take | 356/237.2 |
| 2003/0182251 | A1 | * | 9/2003 | Kim et al. | 706/45 |
| 2004/0234120 | A1 | * | 11/2004 | Honda et al. | 382/145 |

FOREIGN PATENT DOCUMENTS

| | | |
|---|---|---|
| JP | 2001-135692 | 5/2001 |
| JP | 2001-256480 | 9/2001 |

OTHER PUBLICATIONS

Translation of JP2001-256480 (Date: Sep. 2001; Author: Nakagaki, Akira; Country: Japan).*

* cited by examiner

*Primary Examiner*—Brian Q Le
*Assistant Examiner*—Edward Park
(74) *Attorney, Agent, or Firm*—Townsend and Townsend and Crew LLP

(57) ABSTRACT

With little efforts, to estimate the appropriateness of automatic defect classification, and to make classification criteria settable with a guarantee for the better classification performance, defects unknown with their classification classes are classified based on two different classification criteria. Also, defects differed in classification results are collected, and each thereto, a defect classification class is provided by using a manual. Then, the defects provided with the classification classes are divided into two types of groups: one is a setting group for the classification criteria; and the other is an evaluation group. Based on the classification criteria that is so set as to classify the defects included in the setting group with the maximum performance, the classification performance of a case where classification is applied to defects included in the evaluation group is calculated, and the appropriateness of thus set classification criteria is evaluated.

4 Claims, 7 Drawing Sheets

DEFECT CLASSIFICATION USING A LOGICAL EQUATION FOR HIGH STAGE CLASSIFICATION

BACKGROUND OF THE INVENTION

The present invention relates to a defect classification method applied to industrial products utilizing a thin film technology and, more specifically, to a method for automatically setting classification criteria for semiconductor products with which detailed defect review and classification are considered important after defect detection through post-step inspection in the automatic defect classification method.

As semiconductors getting finer in structure, the semiconductor post-processing manufacturing process has become more complicated than ever. With the conventional process control based on the changing number of semiconductor defects detected by outer appearance inspection of semiconductor wafers, it is getting difficult to achieve a high yield for semiconductor manufacturing. In consideration thereof, proposed is Automatic Defect Classification (ADC) for automatically classifying any defects through analysis of images derived after inspection by an outer appearance inspection device. Alternatively, after outer appearance inspection, any defect parts are detected again for subjecting their detailed images to automatic classification.

Such ADC is varied in type, and so far proposed are: the rule type based on a rule predetermined for classifying, into defect classes, defect features containing a plurality of image features extracted from images such as image brightness and defect shape; the teaching type for automatically creating criteria for defect classification based on defect class distribution in a multi-dimensional vector space by regarding defect feature items each being a scalar value as multi-dimensional vectors; and the combination of the rule type and the teaching type. For automatically classifying any defects by ADC, prior to execution, there needs to set defect classification criteria based on defect samples known with their classification classes. The rule type generally requires setting of a determination threshold value each to various defect feature items, and the teaching type requires to derive defect class distribution in the multi-dimensional vector space.

With the conventional technology, the defect classification criteria is set based on the defect feature distribution prior to automatic classification. Thus, the problem of the conventional technology is that the defect feature distribution may look different once automatic classification is started, and if so, automatic classification cannot be appropriately done. For example, if the defect samples prepared at the time of classification criteria setting do not include any important ones, no classification criteria will be set for the defect classes having no samples. Thus, automatic classification cannot be normally done if no measure is taken therefor. Prior to automatic classification, it is unknown whether a target semiconductor layer has any defect different in type from the defect samples which have been already collected. Therefore, it is difficult to determine whether the classification criteria set at this point of time is good enough or not.

To solve such problems, for the purpose of achieving the best classification performance, it is considered necessary to make up for a shortage of any defect class samples that are not used for classification criteria setting, and update the classification criteria thereafter. For making up for the shortage, a lot of defects having been processed after automatic classification are referred to. The problem here is that, however, always monitoring defect classification requires a lot of efforts after once automatic classification is started. Thus, there is no more point for automatic classification, and such an operation cannot be practically carried out in the actual manufacturing lines.

As a conventional technology for solving such a problem, an exemplary method is proposed in JP-A-2001-256480. Specifically, teaching data is created for defect classification first by calculating the amount of features from defects detected from a semiconductor wafer to allocate the result to the feature amount space, and then by performing category assignment from the defect distribution in the feature amount space. At the time of defect classification, the same process is applied to any defects detected for classification from the semiconductor wafer for comparison with the teaching data. As a result of comparison, if any difference is observed therebetween due to varying semiconductor manufacturing processes, for example, the teaching data is to be accordingly corrected based on the observed difference.

The issue here is that the recent process control requires defect classification in a detailed manner, and to make it a reality, the number of dimensions in the feature amount space is getting increased. Therefore, it is difficult to automatically detect the change of the feature amount distribution because the defect distribution is initially derived from the small number of samples. Further, even if the classification criteria is determined as having a problem in its setting through defect monitoring after automatic classification is started, actually, the classification criteria has been considerably difficult to appropriately reset.

The reason is that it is generally impossible to guarantee whether resetting of the classification criteria leads to the classification result more accurate than the one as a result of defect processing in volume following the setting of classification criteria. This is because the defects that have been automatically classified in volume are unknown with their true classification classes. Moreover, resetting of the classification criteria causes the classification result to differ between before and after the resetting. This resultantly varies the number of defects on a classification class basis before and after the resetting, thereby causing inconvenience for process control.

What is more, general users have no idea what resetting of the classification criteria leads to the better classification performance as a whole. To reset the classification criteria, generally, the amount of defect features is calculated for every defect class in a defect cluster prepared in advance, and the resulting distribution is used as a basis for criteria setting. However, if every defect is subjected to feature amount extraction, the performance will be resultantly lowered especially if some defects are added later. For betterment, to derive the best performance, it is important to select only defects needed to obtain the best classification result prior to changing the classification criteria. However, it is still difficult for the general users to know selecting which defect leads to the best result. After all, the classification criteria is set by using every defect to derive the distribution of the defect feature amount. As such, resetting of the classification criteria hardly leads to the better performance.

SUMMARY OF THE INVENTION

An object of the present invention is to estimate the appropriateness of automatic defect classification, and to make classification criteria settable with a guarantee for the better classification performance. Another object thereof is to realize a resetting technique for the classification criteria with which the better classification performance is guaranteed in its entirety.

In order to achieve the above objects, one typical aspect of the present invention is directed to a defect classification method, which includes: a step of calculating classification criteria based on a plurality of teaching defect groups; a step of classifying a defect cluster known with a true classification class using the corresponding classification criteria; a step of calculating an accuracy ratio of a case where the classification criteria is used based on a difference between a classification result using the classification criteria and the true classification class; a step of calculating the relationship between the classification accuracy ratio and the number of teaching defects used for calculation of the classification criteria; a step of calculating a classification criteria A from defects known with their true classification classes; a step of estimating the classification accuracy ratio with respect to the defects known with their classification classes with the classification criteria A by referring to the relationship between the number of teaching defects and the classification accuracy ratio; and when the estimated classification ratio is high, a step of determining as automatic defect classification being executable using the classification criteria A.

These and other objects, features and advantages of the invention will be apparent from the following more particular description of preferred embodiments of the invention, as illustrated in the accompanying drawings.

DESCRIPTION OF THE PREFERRED EMBODIMENTS

In the below, an embodiment of the present invention is described by referring to FIGS. 1 to 8.

As to a semiconductor wafer, the pattern of which is formed to be of multilayer structure by going through a plurality of steps. In the process for manufacturing such a multilayer structure, for monitoring the manufacturing process, every layer is subjected to outer appearance inspection, and if any defect is detected thereby, the defect is reviewed and then classified according to defect type. For defect reviewing, various manners have been proposed and put into practical use as follows:

1. the manner of reviewing images picked up by an inspection device during inspection, 2. the revisit manner of picking up any defect images again using an outer appearance image pickup unit of the inspection device, 3. the manner of performing a review using a review device such as a review Scanning Electronic Microscope (SEM) of a type different from the inspection device.

Described now is the sequence of the third type in more detail. Therewith, the manufacturing process is reviewed to find any problem first by, if any defect is detected after outer appearance inspection, its outer appearance on wafer coordinates is subjected again to image pick-up using a review device to derive a defect image. Then, a user refers to a manual to classify the image into defect classes such as foreign substance included, pattern defect observed, or scratch observed. For each defect type, analysis is applied in terms of the number of defects, the distribution of the defect sizes, and the defect observed position on the wafer.

Because the recent semiconductor process is getting more detailed, in the manufacturing process thereof, a slight amount of deviation from perfect alignment results in rejection of a lot of defective products. This thus requires reviewing of a greater number of defect images. Recently, instead of classifying these reviewed defects using a manual, ADC is growing in importance for its automatic classification.

Figure 1:
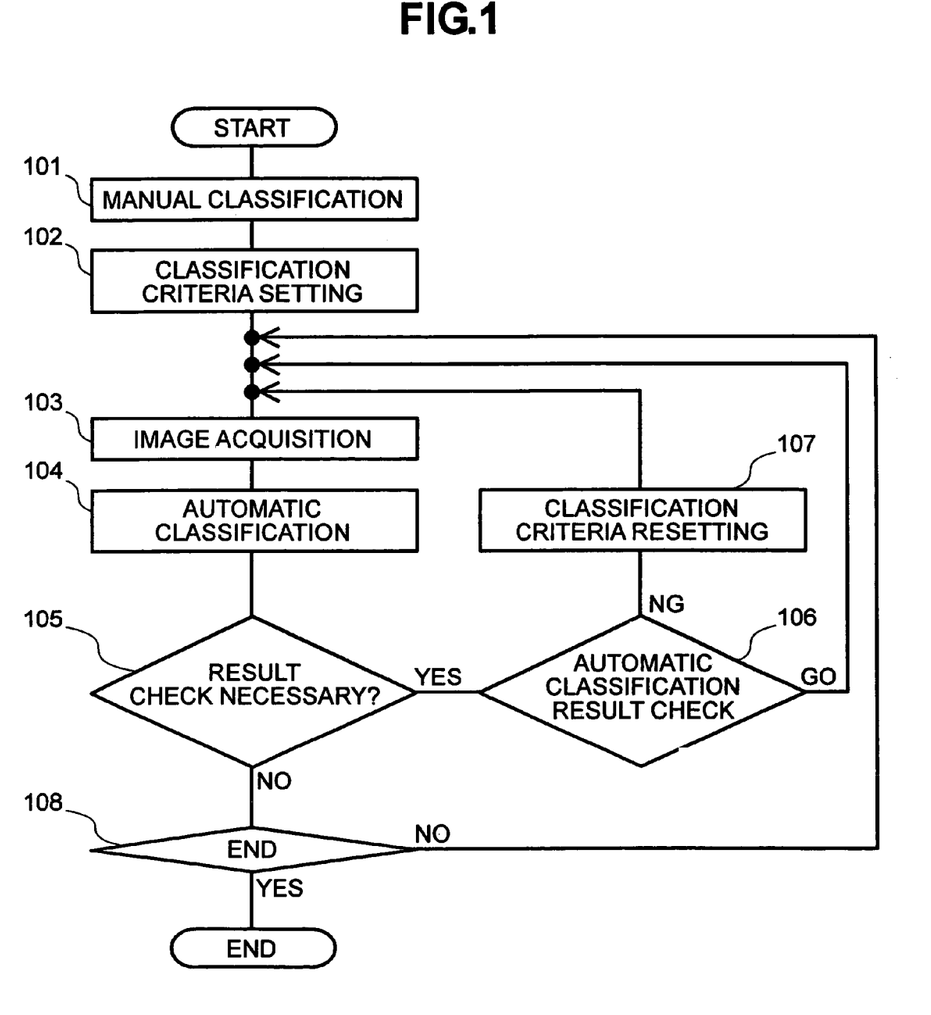
FIG. 1 is a diagram illustrating the basic sequence of a defect classification method in one embodiment of the present invention.

FIG. 1 shows the classification sequence of ADC of the present invention. Step 101 is a classification task step using a manual, and therein, defect images that have been plurally collected are classified through visual evaluation. Step 102 is a step of setting classification criteria using the defects having been completed with visual evaluation in Step 101. This Step 102 is described in more detail by referring to FIG. 2. In Step 10, when a determination is made that the defects having been subjected to manual classification is small in number, defect images are plurally collected again for repeating Step 101.

Figure 7:
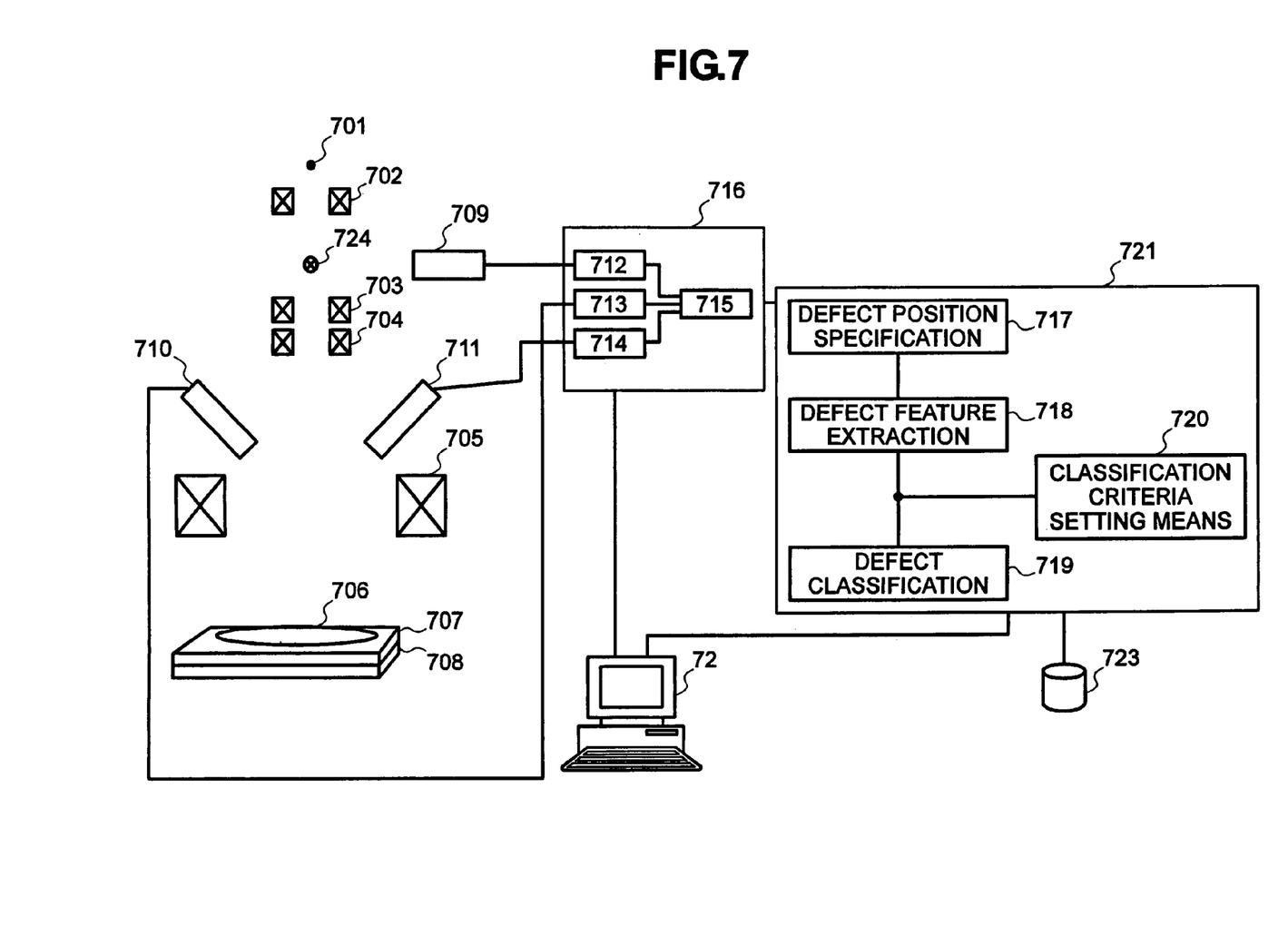
FIG. 7 is a diagram illustrating an exemplary case where the method of the present invention is incorporated into a review SEM.

Step 103 is an image acquisition step, in which any defect images are to be acquired for classification using the classification criteria set in Step 102. An acquisition method applicable thereto may be the one for transferring any image data that is already at hand to a memory region for executing a program by communications means and others, or the one for picking up any new images by such a detection system as shown in FIG. 7, which will be described later. Step 104 is an automatic classification step, in which classification is applied to any defects unknown with their classification results.

Step 105 is a check determination step, in which a determination is made whether the classification criteria set in Step 102 requires evaluation or not. An embodiment of Step 105 will be described in detail by referring to FIG. 8. If the determination made in Step 105 tells that the classification criteria requires no evaluation, another determination is made in Step 108 whether the classification sequence is through. If determined in Step 108 that the sequence is through, the classification sequence is accordingly ended. If determined that the sequence is not yet through, the procedure returns to Step 103.

On the other hand, when the determination made in Step 105 tells that the classification criteria requires evaluation, the procedure goes to Step 106 to go through an automatic classification result check step, in which the defects having been automatically classified in Step 104 are partially evaluated by using a manual to see whether automatic classification has been correctly done in Step 104. If evaluated in this step as automatic classification having been correctly done, the procedure returns to Step 103 for picking up any images unknown with their classification result, and then Step 104 for automatic classification of the images. If the check result in Step 106 tells that the ratio of the correct automatic classification result is low in accuracy ratio, the classification criteria is set again in Step 107 using the images that have been evaluated using the manual in Step 105, and then executes the sequence from image acquisition in Step 103 to automatic classification result check in Step 106.

Before describing this sequence in more detail, a description is made for a method for automatic defect classification. For defect classification, there needs to extract defect features first. The typical defect features are image features and substance composition features. As a method for image feature extraction, so far proposed is the one utilizing defect regions to calculate defect size, shape feature, defect brightness, image texture, and surface unevenness. Here, the defect regions are those calculated through comparison of two images: one is the image including a defect; and the other is the image of a region including no defect but having the same pattern as the other image. As the substance composition features, exemplified is spectrum derived by Energy Dispersive X-ray Fluorescence Spectrometer (EDX), in which defects are exposed to electron beams and the resulting X-rays are analyzed.

As a method for classification criteria setting, known is the rule type, the type teaching about the amount of features, and the combination of these two types. One exemplary classification method of the rule type is found in JP-A-2001-331784. As an exemplary type teaching about the amount of features, a description is found in JP-A-2001-256480 about its classification method and teaching method. As to the classification type of combination between the rule type and the teaching type, a description is found in JP-A-2001-135692.

For example, for defect classification among a bump, a dip, and others with the rule type classification method of JP-A-2001-331784, used are the shading direction derived from right and left images, and position information about defect parts derived from the difference image between a defect image and a reference image. Images generally includes light noises, and thus in order to distinguish between an image noise and shading caused by a scratch defect, a threshold value is needed for use as a distinguishing factor. For example, such a feature as unevenness degree being the total sum of the shading level in the entire defect region is calculated, and if the result is exceeding a predetermined threshold value, it is determined as uneven, and if not, determined as flat. In such a manner, classification criteria is set. For setting of the threshold value indicating such a classification boundary, defects known with their attributes are collected in advance for achieving classification in the most appropriate manner. Here, attributes in this example are those being flat, a bump, or a dip.

In an exemplary teaching type classification method in JP-A-2001-256480, the feature amount space is formed for teaching based on the amount of features extracted from defect images. Described therein is the method for calculating a discriminant that is used for discriminating teaching points. Here, the teaching points are points in the feature amount space represented by feature amount vectors having been extracted from defect images to be used for calculation of the feature space. The feature amount vectors are n-piece combinations (c0, c1, . . . , cn) of feature amounts extracted from one image, where c denotes the feature amount extracted from one defect image, and n denotes the predetermined number of feature amounts. As such, to form such a feature amount space, there needs to set teaching points by plurally collecting defects known with their classification classes.

As shown by the above known examples, prior to going through classification criteria setting as done in step 102, defect collection is generally done for use as a basis thereof. Conventionally, once the collected defects reach a certain number or more, classification criteria setting is accordingly done. For some layers, however, a number of defects are required to be collected for correct automatic classification. On the other hand, for some layers, no such classification criteria is settable no matter how many images are collected. Therefore, if the classification performance fails to reach its sufficient level after classification criteria is once set, with no idea whether the layer is incapable for automatic classification or image collection is not enough, there is no choice but to again go through image collection and resetting of the classification criteria.

Figure 2:
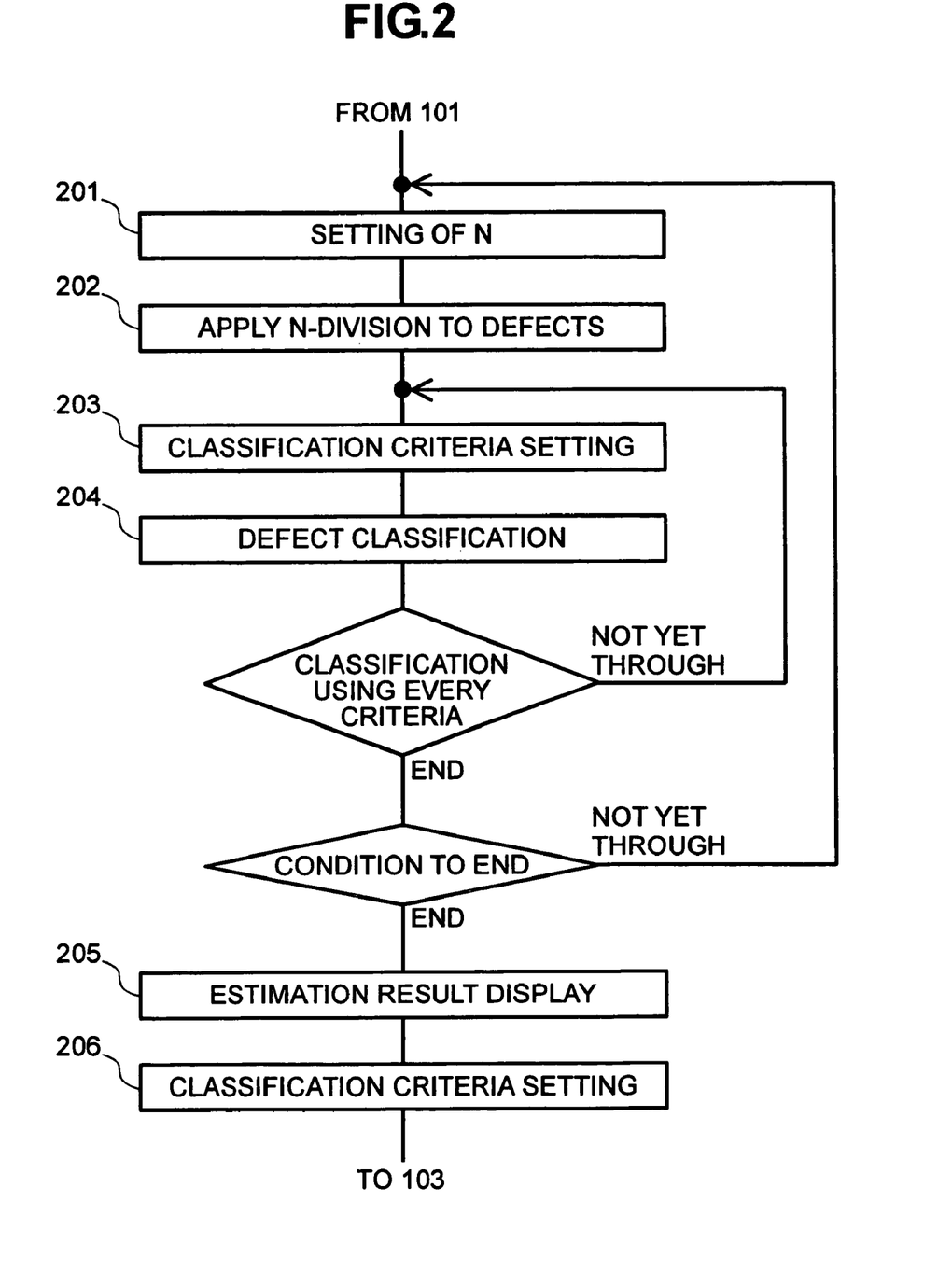
FIG. 2 is a diagram illustrating the classification criteria setting sequence in the defect classification method in the embodiment of the present invention.

FIG. 2 shows a sequence for classification criteria setting of the present invention. First in Step 201, a value N is set for dividing the defect clusters collected in Step 101 into N groups, where N is a certain number. A value 2 is considered convenient for the initial value of N. Next, in Step 202, defects in the defect clusters are allocated in such a manner that each of N groups includes the defect. Each defect is provided with its true classification class by a manual in Step 101, and allocation may be so performed that each group includes each defect type in equal amount. In Step 203, one out of N groups is selected as a classification group, and the remaining N−1 group(s) are selected as teaching groups. Then, the classification criteria is set by referring to the defects included in the teaching group(s).

Then in Step 204, the defects belonging to the classification group are classified according to thus set classification criteria. Because of N groups, there are N different possibilities of selecting one group as a classification group. Thus, Steps 203 and 204 are repeated until every possibility is through. Once N different possibilities are through, derived are the classification results for all of the defects based on the classification criteria, which is obtained from the teaching sets including no classifying defects. In Step 201, the value of N is increased for another process. When the number of N is small, the process may be executed until the number reaches the defecting number. When the number of N is large, the process may be executed until the number reaches about 10 to 20.

Figure 3:
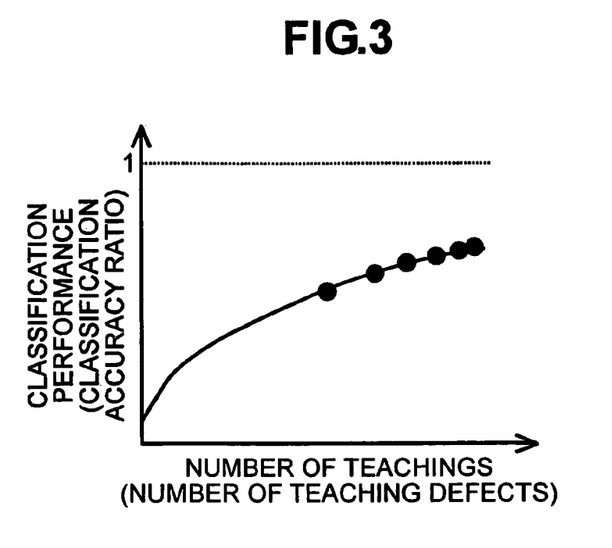
FIG. 3 is a diagram illustrating the basic characteristics of the classification criteria to be evaluated when the classification criteria setting sequence of FIG. 2 is executed.

In a defect class i, the defecting number used for classification criteria setting is presumably Ci, and referred to as teaching defects. In a case where the process is executed until N reaches about 2 to 20, derived is an accuracy ratio for automatic classification when the number of teaching defects changes from Ci/2 to Ci*19/20. Generally, the larger the teaching defects in number, the better the accuracy ratio of classifying the defects not used for classification criteria setting becomes. Thus, derived is such a relationship between the number of teaching defects and the accuracy ratio as shown in FIG. 3. From the classification accuracy ratio of a case where the teaching defects are N being the largest, the classification performance can be estimated for a case where every defect in Step 101 is taught. If this classification accuracy ratio is high enough, the accuracy ratio is considered high of a case where any arbitrary defects unknown with their classification results are automatically classified based on the calculated classification criteria.

On the other hand, if the classification accuracy is low in ratio, considered are two cases. One is the shortage of the number of teaching defects, and the other is the defects being originally impossible for ADC to achieve high classification performance. To see which case, the curve of FIG. 3 may be used as a determination factor. Referring to FIG. 3, when the differentiation value of the curve is positive with N being the largest, the performance can be expectantly improved by increasing the number of teaching defects. In this case, the cause is determined as the shortage of the teaching defects. If the differentiation value of the curve is closer to 0 with N being the largest, it means that the classification accuracy ratio is already saturated, impossible for better performance even if the number of teaching defects is increased. That is, no high performance is expected with ADC.

In Step 205, a graphic display is made for the number of teaching defects—classification accuracy ratio for each classification class and in terms of the comprehensive performance. Further, if the performance is not high enough, a report is displayed to show whether there requires to increase the teaching defects in number or no expectation for better performance. Based on thus displayed report, if the performance is not high enough, the teaching defects are increased in number to repeat Steps 201 to 204, and then the evaluation result is displayed again in Step 205. In such a manner, after evaluating the classification accuracy ratio, in Step 206, classification criteria is generated by using all of the teaching defects. The resulting criteria is regarded as the classification criteria to be generated in Step 102.

Described next is Step 104. The teaching defects to be collected at the time of Step 102 are guaranteed to be classified with a high performance by the sequence of FIG. 2. The problem here is that the performance cannot necessarily be continuously kept because the defect type may not be the same for a long period of time. Therefore, there needs to monitor defect classification using a manual to see if it is correctly performed for a certain period basis. For the purpose, it is desirable to incorporate a monitoring rule into the classification criteria for ADC.

The monitoring rule determines the monitoring timing or defect cluster to monitor based on the following external inputs, i.e., based on at least one of 1. time-serial change of the defecting number observed per wafer in a wafer cluster from which the defect cluster is detected, 2. spatial distribution of defect position derived from the defect cluster that is detected on a wafer basis in the wafer cluster from which the defect cluster is detected, 3. the number of teaching defects used for classification criteria setting, 4. the electric inspection result to be applied to the wafer cluster from which the defect cluster is detected, and 5. the result of defect composition analysis applied to the defect cluster partially or entirely.

Generally, it is considered that the stably-occurring defects are already in the images collected in Step 101 at the time of classification criteria setting, and thus there needs to pay special attention to defects unexpectedly occurring. In view thereof, in the manner of above 1, first the time-serial change of the defecting number observed in a wafer is subjected to analysis. If the defecting number is considerably a lot in the wafer, the classification result will be monitored. In this manner, the classification result of any defects rarely occurring under the state that the process is stably executed can be evaluated, and the evaluation is easily incorporated into the teaching defect cluster. Moreover, with the spatial distribution of the defect position in the manner of above 2, random defects and systematic defects can be derived from the distribution. Accordingly, in a case where the spatial distribution which has not been observed so far is observed, it becomes possible to see how the defects having different features from the teaching defects are classified through monitoring of the classification result.

If the teaching defects already exist in volume, this reduces the need for monitoring the classification state. If the teaching defects are less in number, there needs to check the classification state frequently.

One main object for defect classification is to identify the cause of lowering the product yield. As a method for identifying the defect cause, popularly applied in the actual manufacturing lines is the electrical inspection and the defect composition analysis. Here, any defects highly critical in electrical or physical sense are needed to be subjected to defect classification with a high accuracy. By checking classification result derived as such, realized is automatic classification capable of estimating the defect cause and yield with high accuracy.

Figure 8:
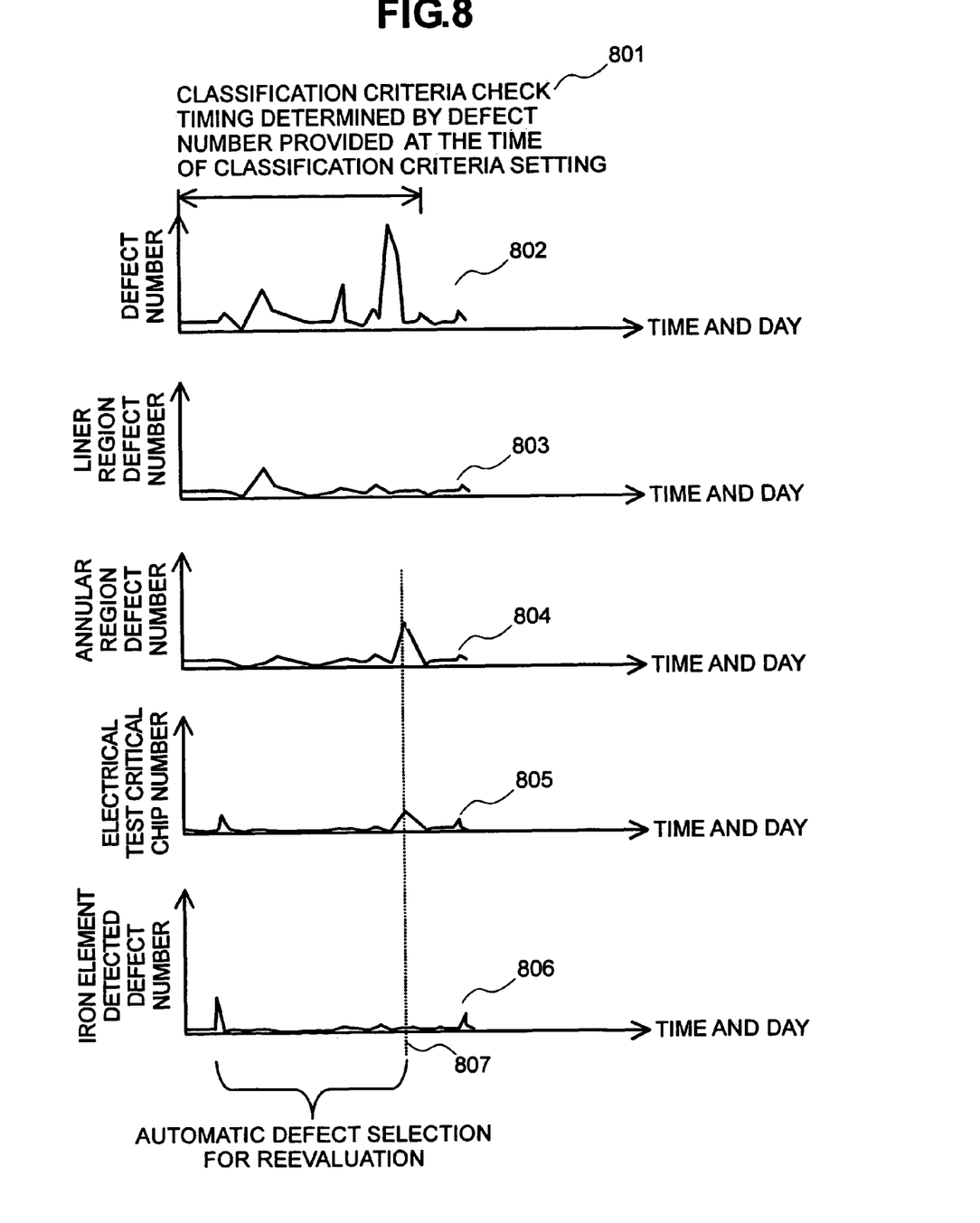
FIG. 8 is a diagram illustrating a classification criteria resetting timing in the defect classification method in the embodiment of the present invention.

FIG. 8 shows such details. Therein, a reference numeral 801 shows a classification criteria check timing that has been previously determined when the classification criteria is set. This check timing will be set long if the defects used for setting the classification criteria in Step 102 are large in number, and if small in number, the check timing will be set short. When the monitoring result of the above monitoring rule at least singly selected from (1) to (5) changes to a greater degree, the check timing is changed in accordance with the change, for example. A reference numeral 802 shows the time-series change of the number of the defects detected per wafer described in the monitoring rule (1). Reference numerals 803 and 804 both show the number of defects as a result of detection where any characteristic patterns are observed in the defect position distribution detected per wafer. Specifically, 803 shows the number of defects as a result of detection where any linear patterns are observed in the defect position distribution, and 804 shows the number of defects as a result of detection where any annular patterns are observed in the defect position distribution. A reference numeral 805 shows the time-varying number of chips determined as defects as a result of electrical text, and a reference numeral 806 shows the number of defects in which any iron elements are found after EDX analysis. In this example, presumably, prior to the classification result check timing determined based on the teaching defect number of 801, occurrence of a large number of annular defects is newly observed. Accordingly, the ADC system makes a notice that there needs to check the defect classification result with the timing shown in 807. At this time, out of the defects having through classification before 807, the ADC system also automatically extracts any defect clusters required to check the defect classification result.

As such, by the preset monitoring rule, in the ADC system, the defects having been subjected to automatic classification in Step 104 are used to extract a defect cluster to be checked for their classification state, and the extraction result is displayed for the user. This process may be done by a review device for picking up defect images, or a computer terminal connected over a network. The user may provide the manual-classification result to the defect cluster thus extracted by the ADC system so that the Step 106 can be realized for automatic classification result check. The classification result derived in Step 106 is preferably used for resetting of the classification criteria as it is.

If the classification criteria is changed, however, a problem arises. That is, using the teaching data derived in Step 106 does not guarantee whether the classification performance will be truly improved. In detail, the teaching defects used for initial setting and the defect cluster checked in Step 106 are all used as the teaching defects for generating the new classification criteria in Step 107. Thus, the teaching defect cluster applied with the classification criteria through the sequence described by referring to FIG. 2 can be checked with its performance. On the other hand, as to the defects other than those having been subjected to classification in Step 104, and provided with the classification results by manual in step 106 are unknown with their true classification results. There is no way to check whether their performance will be improved or reduced by the newly-set classification criteria. Actually, with some classification engines, a lot of phenomena of lowered classification performance are so far reported due to performing unbalanced teachings. To generate the classification criteria in Step 107, required is the guarantee not causing the classification performance to be reduced.

Figure 4:
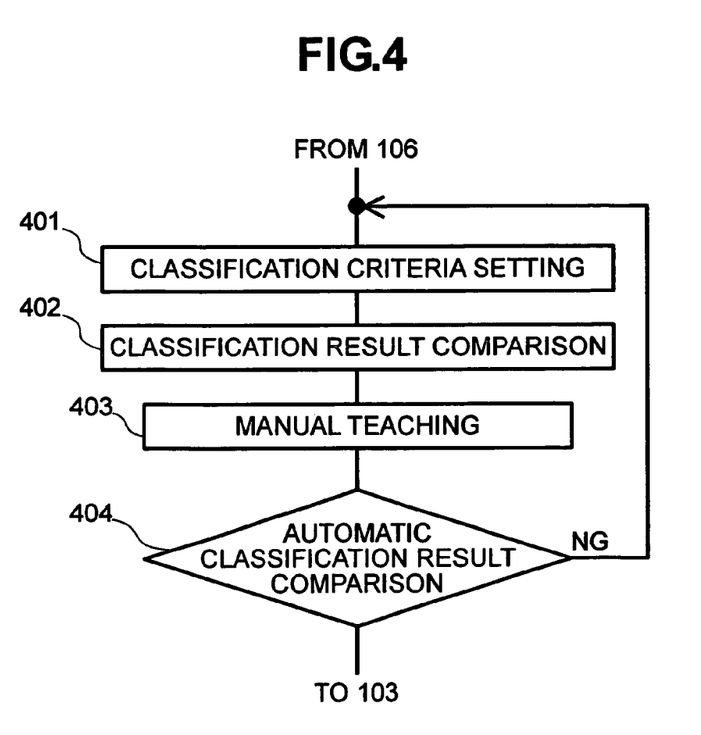
FIG. 4 is a diagram illustrating the classification criteria change sequence in the defect classification method in the embodiment of the present invention.

A solution proposed by the present invention for such a problem is shown in FIG. 4. FIG. 4 shows a process to be executed in Step 107 of FIG. 1. Step 401 is a step of setting classification criteria using any given teaching defects. Step 402 is a step of extracting any difference of the classification results derived by classifying the defects having been classified in Step 104 partially or entirely using both classification criteria before and after its change. By checking only the defects extracted in Step 402 as determined as having any difference from the classification result, the defects having been through comparison in Step 402 can be evaluated by performance before and after the change of the classification criteria.

In Step 403, only to the defects classified and determined as having any difference in Step 402, their true classification results are taught by a manual. If the initial classification criteria generated in Step 102 is already adjusted sufficiently, under normal circumstances, the defects showing any difference in the classification result will be small in number. In comparison between the true classification result input in Step 403 and the classification result in Step 402 for evaluation, if the classification performance by the classification criteria generated in Step 107 is lowered than the initial classification criteria generated in Step 102, the defects subjected to manual classification in Step 403 are again added to the teaching defect cluster, and the classification criteria is set again in Step 401. By establishing such a sequence, provided is the classification criteria capable of guaranteeing the better performance through addition of the teaching defects.

Described so far are only the methods for adding the teaching defects for improving the classification performance. For improving the classification performance to a greater degree, there needs to delete any unnecessary teaching defects. Generally, the teaching defect images are normally picked up. From some images, however, the defect regions cannot be correctly extracted due to the image pick-up condition such as charging of SEM images, or even if extracted, the result may be unusually bright. If the classification criteria is set by using the resulting defects, the feature amount that is not originally supposed to distribute is used for criteria resetting. As a result, the classification performance will be lowered.

Thus, now required is to extract teaching data as a cause of lowering the classification performance. An exemplary sequence therefor is described by referring to FIG. 5. First in Step 501, a defect is designated from a teaching defect cluster as a determination factor. Then in Step 502, the teaching defects except for the defect designated in Step 501 are divided into N groups. Here, N denotes the number of teaching defects or smaller, and may be divided in advance to be about 20. Here, such division is applied to equalize the defecting number included in each defect class in each group.

Figure 5:
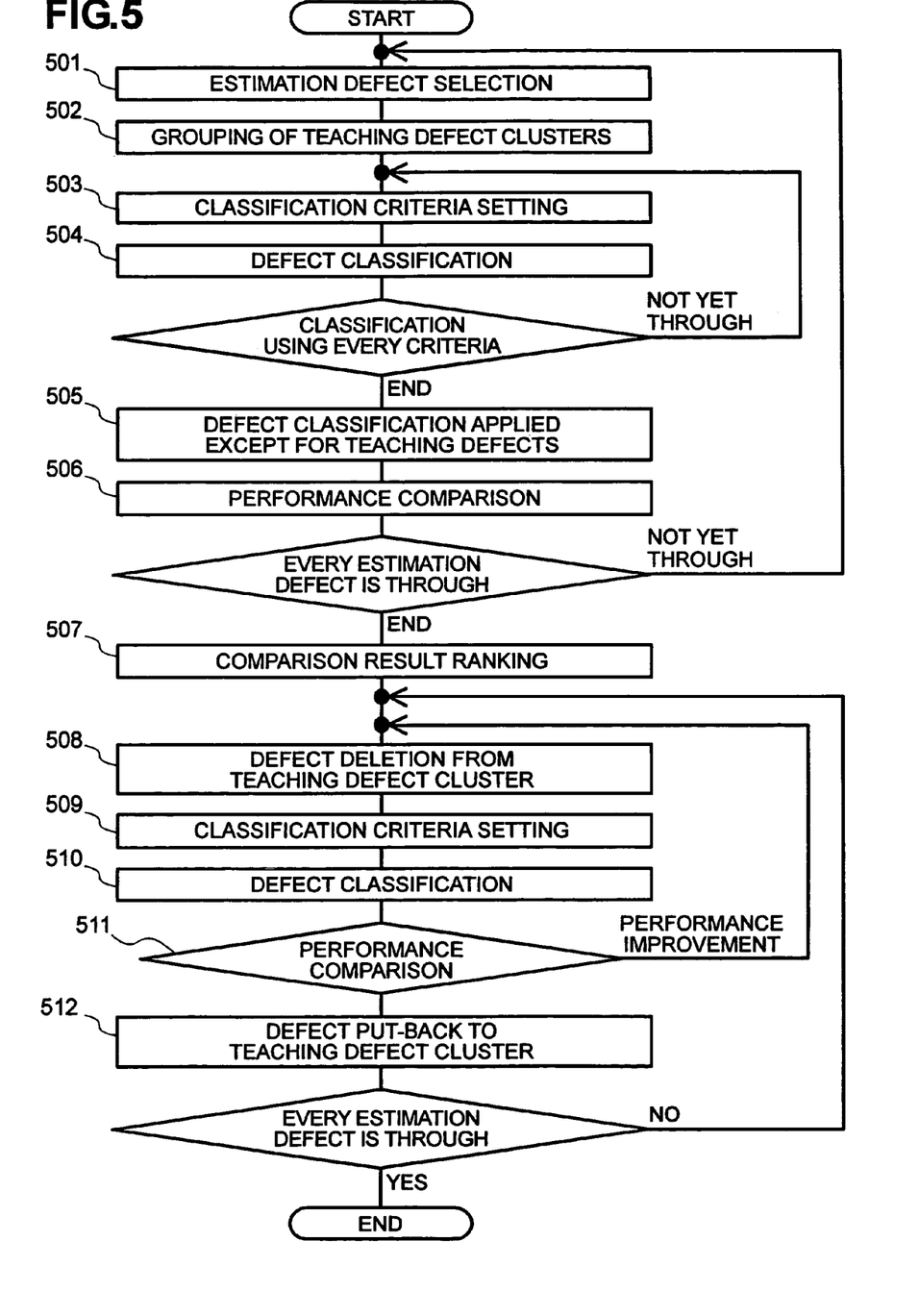
FIG. 5 is a diagram illustrating the sequence for selecting a defect to be used as a reference for classification criteria setting in the defect classification method in the embodiment of the present invention.

In step 503, one group is selected thereamong, and using any defects belonging to the remaining groups are used to calculate the classification criteria. Then in Step 504, classification is applied to defects belonging to the group selected in Step 503. Such a process is executed for N times while changing the group to be selected in Steps 503 and 504, thereby deriving the classification result for every teaching defect. In Step 505, classification is applied to defects known with their true classification results, excepting for the teaching defects. The classification results derived as such in Steps 504 and 505 are compared with the true classification result. Then in Step 506, comparison is made between the classification performances before and after deleting the teaching defect designated in Step 501. In Step 506, if determined as the performance being improved by deletion as such from the teaching defects, the corresponding defect will be a candidate as the one better to be deleted from the teaching defects.

Here, as a method to see whether the classification performance is improved, there are a method for comparing the accuracy ratio among the classification classes, a method for comparison in terms of comprehensive performance, and a method of combination thereof. If the performance is improved as a result of both comparisons, the corresponding defects are regarded as the ones that have to be deleted. If the performance is reduced as a result of both comparisons, the defects are regarded as the ones essential for the teaching defects. And if the performance is improved as a result of either one comparison, the defects may be deleted or left as they are.

The sequence from Steps 501 to 506 is executed while changing the teaching defect to be selected in Step 501. In such a manner, unnecessary teaching data is extracted.

Next, in Step 507, the teaching defects are ranked in order of showing the better performance improvement through comparison in Step 506. In Step 508, the teaching defect is deleted one by one from the teaching defect cluster from the higher order, and in Step 509, the classification criteria is set from the remaining teaching defect cluster.

Step 510 is a step of performing classification using the classification criteria set in Step 509. Therein, the process of Steps 502 to 505 is internally executed. Then in Step 511, the classification result and the true classification are compared with each other, and when the performance is determined as being improved, the procedure returns to Step 508 for its process. On the other hand, if the performance is not improved, the teaching defect lastly deleted from the teaching defect cluster in Step 512 is put back to the teaching defects again. Then the procedure returns to Step 508 to evaluate the next defect.

The sequence described referring to FIG. 5 is considerably important in the respect of determining whether or not to add the small number of teaching defects. To add the small number of teaching defects, the feature amount distribution of the adding teaching defect cluster is not necessarily the same as that of the defect class. Thus, in Step 401 or 403 in the sequence of FIG. 4, incorporating the sequence of FIG. 5 is considered important for setting the best classification criteria.

Here, the sequence of FIG. 5 is a scheme guaranteeing to improve the comprehensive performance. For the user, however, there exits a considerably critical defect wanting to classify for sure no matter if the comprehensive performance is lowered to some degree. For such a special case, no care can be taken to improve the classification performance. In this sense, to improve the performance by the sequence of FIG. 5, the defects regarded as desirable to be deleted from the teaching defect cluster may be explicitly displayed for the user to allow him or her to check, and to perform performance comparison between a case where deletion is accordingly made and a case where no deletion is made.

Figure 6:
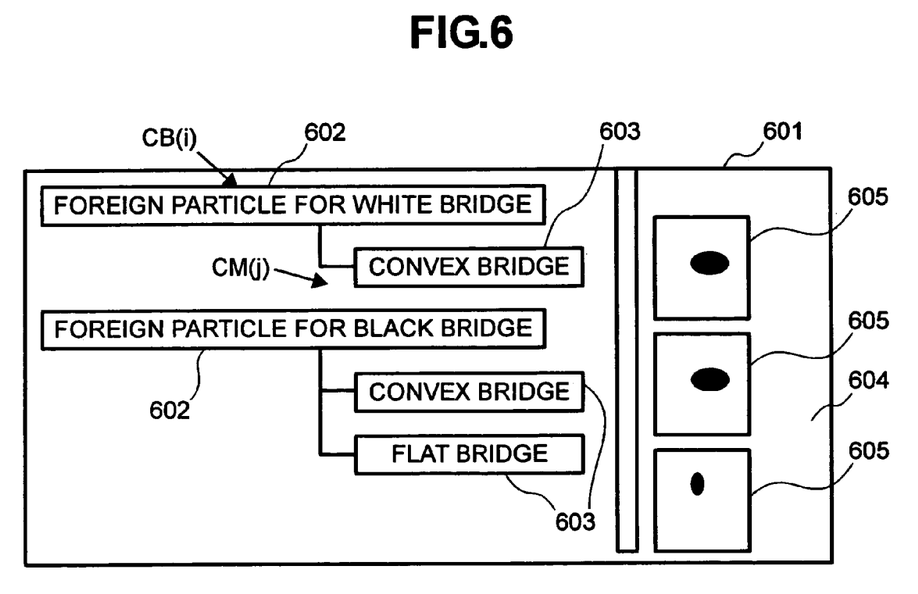
FIG. 6 is a diagram illustrating an exemplary teaching screen of the classification criteria in the defect classification method in the embodiment of the present invention.

Here, the method for classification criteria setting is found in JP-A-2001-256480 using a classification device of a teaching type. If the classification device is structured by a classification unit of a first layer and that of a layer lower thereto as the classification device described in JP-A-2001-135692, a type including semiconductor expertise by a rule logic, conventionally required is parameter setting using a manual to set classification criteria for the first layer. This is because even if teaching is made to the lower-layer classification unit for classification result, the lower-layer classification unit is not necessarily corresponding 1:1 to the first-layer classification unit. Thus, no such classification result can be obtained as expected by the discriminant used by the rule logic for the first layer. To solve such a problem, with the technique of the present invention, also to the classification result obtained by an upper-layer classification unit, that is, the classification result being intermediate for the user who sets the classification criteria, the manual will provide the classification result. FIG. 6 shows such an exemplary case. A reference numeral 601 denotes a Graphical User Interface (GUI) for classification criteria setting, and a reference numeral 602 denotes a tag indicating the defect class of the lower layer. A reference numeral 603 denotes a tag indicating the defect class of the intermediate layer. For an arbitrary defect to be classified into the defect class CB(i) of the lower layer, with the condition of the defect being classified into the intermediate layer class CM(j), the tag 602 corresponding to CB(i) is linked to the tag 603 corresponding to CM(j) on the GUI.

To the area denoted by a reference numeral 604, a thumb nail image 605 of the defect is displayed. The GUI 601 allows a user to input any instruction using a mouse pointer. When the user designates the tag 602 by the pointer, the area 604 responsively displays the thumb hail image 605 of the defect belonging to the defect class indicated by the tag 602. The thumb nail image 605 displayed in the area 604 is arbitrarily moved to one tag 603 via dragging and dropping popularly done in the GUI. In this manner, the true classification result for the lower-layer classification and the true classification result for the intermediate-layer classification can be simultaneously designated. By applying such an operation to every defect, all of the defects are provided with the classifying results for the intermediate layer and the lower layer.

In the above, described is the method for teaching the true classification results of the intermediate and lower layers for the user by referring to FIG. 6. However, providing the classifying result of the intermediate layer may complicate the operation, and thus the operability is not so good in view of the user. To achieve classification criteria setting by placing a minimal burden on the user, desirably, the user may set the classification criteria only for the lower layer. In the conventionally-known automatic classification method, known as multi-layer structure is a neutral network of back propagation type, for example. Therewith, provided are only the answer of the last classification for the lower layer, and the lower layer and the intermediate layer can be set by classification criteria without answer-teaching to the intermediate layer. This method, however, requires a number of data, otherwise no appropriate classification criteria can be set. For the user as well, even if checking the result of the intermediate layer, he or she cannot determine if the classification criteria so far set is appropriate. Accordingly, such a neutral network typified by the conventional back propagation type has been difficult for practical use with semiconductor defect classification, requiring users to set classification criteria on a step basis.

As a solution, as described in JP-A-2001-135692, using the rule type is getting popular for intermediate-layer classification. With such a type, the intermediate-layer determination is often expressed by a logical equation as shown in JP-A-2001-256480. If this is the case, as a reference to distinguish among bump, dip, and flat described therein, a discriminant is set again using one feature predetermined by the rule, or using a small amount of features. That is, with the neutral network of the back propagation type of the conventional technology, there is no specific limitation between the result and the input of the intermediate layer. On the other hand, with the one calculating the intermediate layer with the rule type, the relationship between the calculation result and the input of the intermediate layer is predetermined. Such a limitation enables appropriate classification criteria setting using the less teaching defects.

Here, at the time of discriminant setting for the intermediate layer, no output cannot be derived as an answer for the intermediate layer. This problem is solved by estimating any change of the classification accuracy ratio of the lower layer when the discriminant of the intermediate layer is changed, and the discriminant is so set that the accuracy ratio is increased to a greater degree.

Assuming here that the feature amount vector is Fm for classification of the intermediate layer of a defect d, true classification class of which is i for the lower layer, and the feature amount vector is Fb for classification of the lower layer. In such a case, with the class of the intermediate layer represented by J, the discriminant corresponding to the classification class i will be the following equation 1, for example.

$$f(i)(Fm,Fb)=\max_j(f1(j)(Fm)f2(i,j)(Fb))  \quad \text{Equation 1}$$

The requirement for the defect to be classified into the class i is to be classified into the intermediate class J, with which $f2(i,J)(Fb)>f2(k,j)(Fb)$ is established with respect to an arbitrary class k. Thus, if the defect is classified into the class j including the class k not satisfying $f2(i,j)(Fb)>f2(k,j)(Fb)$, the cost evaluation expression is evaluated. To minimize this cost, the discriminant of the intermediate layer $f1(j)(Fm)$ is set. In such a manner, the classification criteria of the intermediate layer is changed. Here, because the intermediate layer is classified by the rule type, $f1(j)(Fm)$ is, as more specific example, is expressed by the following equation 2.

$$f1(j)(Fm)=(Fm1>th1 \cap Fm2>th2) \cup Fm3>th3 \quad \text{Equation 2}$$

Although the accuracy ratio does not necessarily become maximum through such a change, the logical equation can be changed in such a manner as to make the accuracy ratio at least better than that of the initial state.

Unlike such a conventionally-known technique as neutral network of back propagation type, to change the discriminant with the method of the present invention, there only needs to change three variables for the logical equation expressed by the above equation 2. Thus, it leads to a low degree of flexibility, whereby more stable performance can be derived with the teaching defects less in number. What is better, the logical equation is established based on the expertise that is previously obtained. Thus, advantageously, a complicated equation that is quite difficult with general learning can be provided.

As such, described above are the classification methods, and the method of the present invention is surely applicable to various devices, for example, to a review SEM for reviewing semiconductor defects. In FIG. 7, a reference numeral 701 denotes an electron beam source, and a reference numeral 702 denotes a condenser lens. Reference numerals 703 and 704 are deflection means in X and Y directions, respectively, for controlling the exposure positions of electron beams in the XY direction. The electron beams deflected by the deflection means are converged by an objective lens 705, and irradiated onto a semiconductor wafer 707 being an observation object fixed onto an XY stage structured by 707 and 708. Through electron beams irradiated onto the observation object, secondary electron is generated to the observation object. Such generation is detected by secondary electron detection means 709 via an E×B deflector denoted by a reference numeral 724. Reference numerals 710 and 711 are both a reflected electron detector for detecting any reflected electrons coming from varying directions. A reference numeral 716 denotes an imaging unit for the detected electrons. Reference numerals 712, 713, and 714 all denote an A/D converter, which converts electronic signals detected by 709, 710, and 711 into digital data for storage into memory 715. Through control over 703 and 704, the electron beam exposure positions are subjected to two-dimensional scanning. Thereby, formed to the image memory 715 are two-dimensional images of the secondary electrons detected by 709, two-dimensional images of the reflected electrons detected by 710, and reflected electron images detected by 711. The images stored in the unit of 716 are subjected to a process by an image processing unit denoted by a reference numeral 721, and accordingly, defect automatic classification is applied. A reference numeral 717 is a defect position specification unit, which calculates any defect region from the images. A reference numeral 718 denotes a defect feature extraction unit, which extracts the defect image feature amount from the secondary defect images formed by the image memory 715. Herein, the shape of the defect region or the brightness in the defect region calculated by 717 are regarded as defect feature amounts. The image feature amount extracted by 717 and the secondary defect image stored in 716 can be stored in secondary storage means 723. A reference numeral 720 denotes classification criteria setting means, which realizes the classification criteria setting method already described in the above. A reference numeral 719 denotes classification means, which goes through defect classification using the classification criteria set by the classification criteria setting means 720. The classification means 719 can classify in real time the image features derived by the image processing means 717, and the defects stored in the secondary storage means 723. A reference numeral 722 denotes a graphic terminal, which displays users with the images stored in 716, the classification result derived by 721, or the classification criteria set by 720. This terminal can display also the GUI described by referring to FIG. 6, whereby the users can show the classification result by using a manual. What is more, this terminal can display the relationship between the teaching defect number and the classification accuracy ratio described by referring to FIG. 3.

Described herein is an exemplary incorporation into the review SEM. The method of the present invention is surely incorporated in an optical review device, or used as a method for automatic defect classification unit incorporated on an inspection device.

As described in the foregoing, according to the present invention, with little efforts, the appropriateness of automatic defect classification can be estimated, and classification criteria can be set with a guarantee for the better classification performance. Further, a resetting technique for the classification criteria with which the better classification performance is guaranteed in its entirety can be realized, having great significance as such.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computer-readable medium for defect classification having sets of instructions stored thereon which, when executed by a machine, cause the machine to:

create a classification criteria using teaching data whose defect classification class is known;

classify defects, whose defect classification class is known by using the classification criteria created at the step of creating;

derive a classification performance of the classification criteria from a result of the step of classifying defects; and correct the classification criteria created by the step of creating based on the classification performance derived by the step of deriving, wherein in the step of creating the classification criteria, the classification criteria is set by using a classification unit having a hierarchy structure including a higher stage classifier which includes intermediate classes and a lower stage classifier which includes plural classifiers each belonging to one of the intermediate classes and provides a final classification result, and the higher stage classifier includes a logical equation using a feature amount of the defect and a threshold and said higher stage classifier is so determined that the classification performance of the lower stage classifier derived at the step of deriving is of a greater degree than other classifiers when estimating changes of the classification accuracy ratio of the lower layer by changing the logical equation of the higher stage classifier, wherein the higher stage classifier is configured to classify the defects into the intermediate classes by using a first feature amount, and the lower stage classifier is configured to classify the defect which classified into the intermediate classes into the final classification result, by using a second feature amount which is different from the first feature amount.

2. The computer-readable medium according to claim 1, wherein in the step of deriving the classification performance of the classification criteria, the classification performance is derived based on an accuracy ratio for the data known with the classification class that is derived in the step of classifying the data known with the defect classification class based on the classification criteria.

3. An apparatus for classifying defects comprising:

classification criteria creating unit which creates a classification criteria using teaching data whose defect classification class is known;

classifying unit which classifies defects by using the classification criteria created by the classification criteria creating unit;

classification performance deriving unit which derives a classification performance of the classification criteria from a result of the classifying unit classifying defects whose defect classification class is known; and classification criteria correcting unit which corrects the classification criteria based on the classification performance outputted from the classification performance deriving unit, wherein said classification criteria creating unit creates a set of classifiers having a hierarchy structure including a higher stage classifier which includes intermediate classes and a lower stage classifier which includes plural classifiers each belonging to one of the intermediate classes and provides a final classification result, and the higher stage classifier includes a logical equation using a feature amount of the defect and a threshold and said higher stage classifier is so determined that the classification performance of the lower stage classifier derived at the step of deriving is of a greater degree than other classifiers when estimating changes of the classification accuracy ratio of the lower layer by changing the logical equation of the higher stage classifier, wherein the higher stage classifier is configured to classify the defects into the intermediate classes by using a first feature amount, and the lower stage classifier is configured to classify the defect which classified into the intermediate classes into the final classification result, by using a second feature amount which is different from the first feature amount.

4. An apparatus for classifying defects according to the claim 3, further comprising a display unit which displays an image of the classification criteria corrected by the classification criteria correcting unit together with an image of a defect classified by the classifying unit using the classification criteria corrected by the classification criteria correcting unit.

* * * * *